(No Model.)

M. MEAGHER.
TOOL FOR SETTING, GAGING, AND JOINTING SAWS.

No. 466,697. Patented Jan. 5, 1892.

WITNESSES
F. L. Ourand.
Van Buren Hillyard.

INVENTOR
Michael Meagher,
By R. S. & A. B. Lacey
HIS Attorneys.

UNITED STATES PATENT OFFICE.

MICHAEL MEAGHER, OF EAU CLAIRE, WISCONSIN.

TOOL FOR SETTING, GAGING, AND JOINTING SAWS.

SPECIFICATION forming part of Letters Patent No. 466,697, dated January 5, 1892.

Application filed March 31, 1891. Serial No. 387,167. (No model.)

*To all whom it may concern:*

Be it known that I, MICHAEL MEAGHER, a citizen of the United States, residing at Eau Claire, in the county of Eau Claire and State of Wisconsin, have invented certain new and useful Improvements in a Combined Saw-Set, Raker-Gage, and Jointing and Gaging Tool; and I do hereby declare the following to be a full, clear, and exact description of the invention, such as will enable others skilled in the art to which it appertains to make and use the same.

This invention relates to a combined saw-set, raker-gage, and jointing and setting tool, and aims to provide a tool which for all practical purposes will be cast solid, except one part, which is adjustable to clamp a file for jointing the saw and gaging the raker-teeth.

The improvement consists of the novel features which will be hereinafter more fully described and claimed, and which are shown in the annexed drawings, in which—

Figure 1:
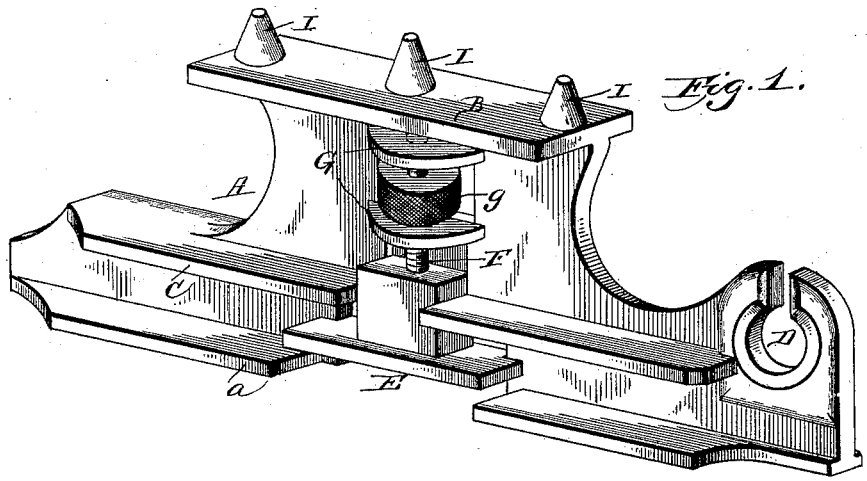
Figure 2:
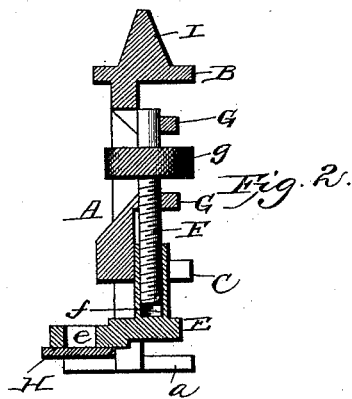
Figure 4:
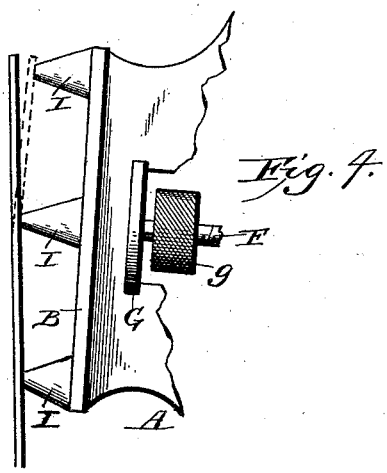
Figure 3:
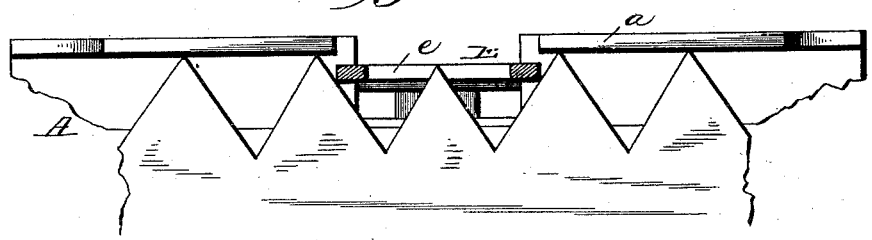

Figure 1 is a perspective view of a tool embodying my invention. Fig. 2 is a cross-section of the tool on the line X X of Fig. 1, showing the file in place for jointing saws. Fig. 3 is a detail view showing the manner of gaging the raker-teeth. Fig. 4 is a detail view showing the manner of gaging the saw.

The stock A is provided at its lower edge with the foot a, which projects laterally on each side of the stock, and at its top edge with a cap-piece B, which projects on one side of the stock about equal to the projecting portion of the foot-piece. A guide rib or flange C, parallel with the cap and foot and located close to the latter, extends laterally from the stock a distance about equal to the projecting portion of the foot and the cap. The saw-set D at one end of the stock is of usual construction, being a slot in a projecting portion of the said stock. The clamp and raker-gage E is located about midway between the ends of the stock and comprises a cross-head and a shank, the latter having a screw-threaded opening *f* to receive the adjusting-screw F, which is journaled at its upper end in the lateral lugs. The thumb-wheel *g*, which is secured on the screw F, is arranged between the lugs G and extends on each side of the stock through an opening therein. The foot-piece is cut away to receive the clamp and raker-gage, and the edges of the cross-head are notched to receive the projecting portions of the stock on each side of the said opening thus formed to receive the said clamp and gage to guide the latter in its vertical movements. One portion of the cross-head is provided with the longitudinal slot *e*, through which the raker-teeth of a saw project to be gaged, while the ends of the cutting-teeth come against the inner side of the foot *a*. By operating the adjusting-screw F the clamp and gage can be moved at any distance from the foot *a* to adapt it to the saw to be operated on. For jointing a saw a file H is inserted between the foot and the clamp, and the latter is forced down by the set-screw sufficiently to bind the file and hold it securely.

The tapering projections I (three in number) on the cap-piece B serve to gage the saw, which is gaged by bending the teeth so as to cut a wide or narrow space. Now by placing this gage one prong on the top of the teeth the other will come down over the base of the tooth and the other still farther down the face of the saw. If the gage is desired to be made larger, by filing off lightly the top prong the tooth can be bent out, and this will be the gage for setting each tooth in the saw. If the gage is desired to be made larger, by rubbing off lightly the middle prong in order to have the three prongs rest upon the saw, and the teeth will have to be bent back, or by rubbing file on center would lessen gage.

Fig. 3 shows the manner of gaging the raker-teeth of a saw, the tool being inverted and the raker-teeth, one at a time, being thrust through the slot *e* in the gage E, the cutting-teeth touching the foot *a*. Obviously if the raker-tooth is too long it will project beyond the gage and will be filed off flush with the said gage.

A saw is jointed or topped by passing a file over the ends of the teeth to reduce them to the same level. In Fig. 2 a flat file is shown clamped between the foot of the tool and the cross-head, a portion of the file near one edge projecting. This projecting portion is the active part of the file and is passed over the ends of the saw-teeth, the edge of the foot touching the sides of the teeth and forming a guide to facilitate the operation of the tool.

Having thus described my invention, what I claim, and desire to secure by Letters Patent, is—

1. A combined saw-set, raker-gage, and jointing and gaging tool comprising a stock having cap B, foot a, and rib C, parallel with the cap and foot and having projections I on the said cap and having a saw-set at one end, a cross-head located between the ends of the stock and projected laterally on each side thereof and having a slot e and having a shank, and a set-screw for adjusting the said cross-head to and from the foot to clamp a file and gage the raker-teeth, substantially in the manner set forth.

2. The combination, with the stock having foot a, rib C, and the lateral lugs G, of the cross-head E, fitted in a recess formed by cutting away a portion of the stock and the foot a and having notches to receive the portions of the stock on each side of the said recess and having slot e and a shank, and the set-screw journaled in the lugs G and having engagement with the shank of the cross-head, the thumb-wheel of the set-screw projecting on one side through an opening in the stock, substantially as and for the purpose described.

In testimony whereof I affix my signature in presence of two witnesses.

MICHAEL MEAGHER.

Witnesses:
T. F. FRAWLEY,
ROY WILCOX.